Oct. 29, 1929.                J. BIJUR                1,734,026
                         FLOW CONTROL FITTING
                       Original Filed Aug. 9, 1922
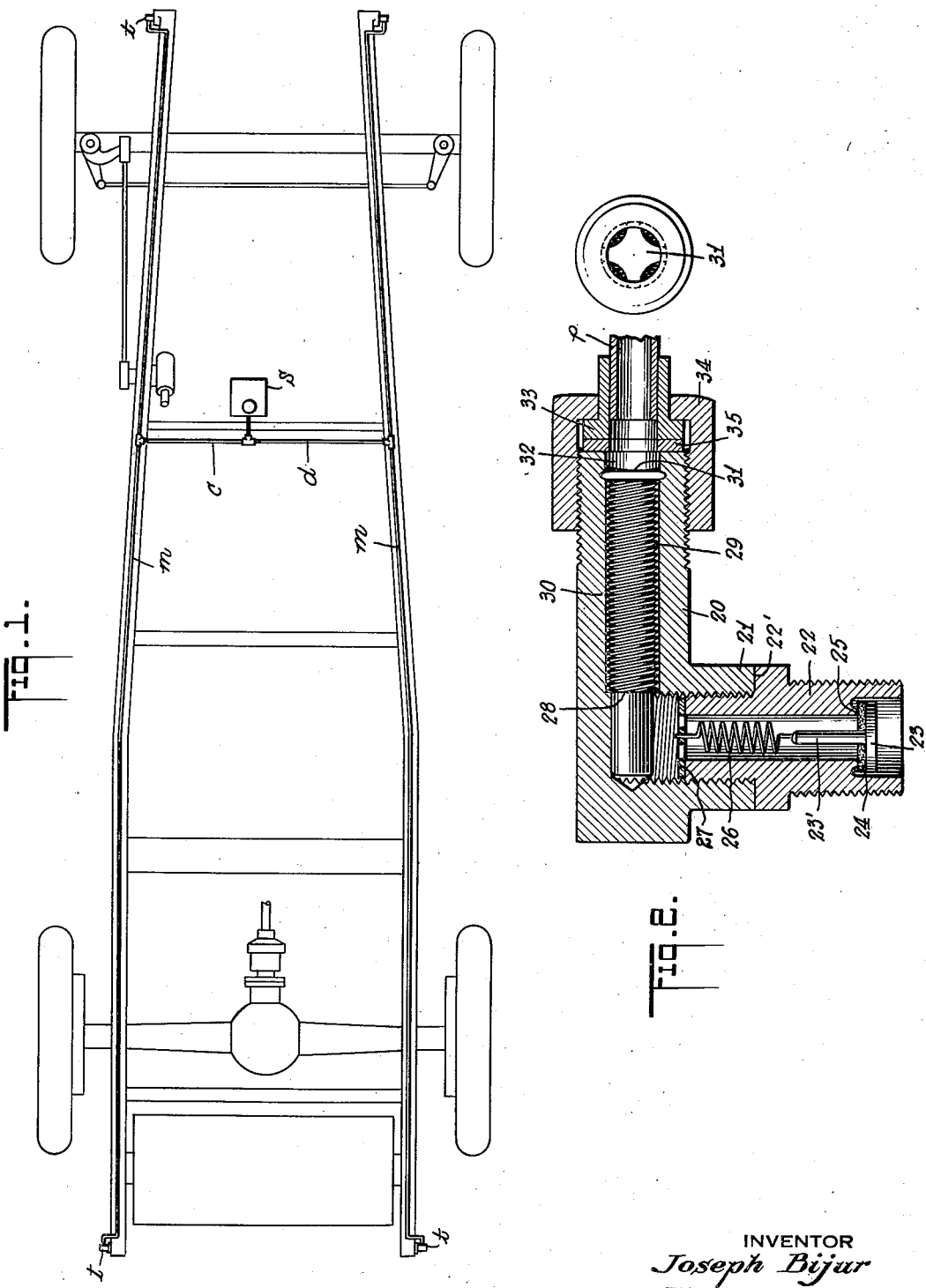
INVENTOR
Joseph Bijur
BY
Dean, Fairbank, Obricght & Hirsch
his ATTORNEYS Patented Oct. 29, 1929

1,734,026

UNITED STATES PATENT OFFICE

JOSEPH BIJUR, OF NEW YORK, N. Y., ASSIGNOR TO AUTO-RESEARCH CORPORATION, A CORPORATION OF DELAWARE

FLOW-CONTROL FITTING

Original application filed August 9, 1922, Serial No. 580,668. Divided and this application filed June 5, 1928. Serial No. 282,959.

My present invention relates primarily to central chassis lubrication and is more especially concerned with flow control devices of the drip plug type, described in my Patent No. 1,632,772 of June 14, 1927.

It is an object of the invention to provide a drip plug of the above type, the constituent flow restricting parts of which, even though of very high resistance may be made accurately in mass production, by the use of high-speed ordinary automatic machinery and without the need for unusual manufacturing precautions, and in which the flow resistance producing means though embodied in a short structure is yet not so fine as to be clogged by particles that could pass through a fine wire mesh strainer.

The object is accomplished by intimate surface engagement of a pair of members of metal or other hard material, a fine groove being provided at the surface of contact to afford a restricted pressure absorbing passage. Preferably the coacting elements are an imperforate filler plug snugly lodged in a corresponding aperture or bore in a holder therefor.

In a desirable specific embodiment the plug and bore are of relatively large diameter and short length, a multiplicity of turns of a thread of correspondingly low pitch at the surface of contact between the fitting and the plug, providing a very long and correspondingly highly resistant helical passage.

The fitting has a nipple outlet for application thereof at a bearing and has a threaded inlet for coupling of the feed pipe extremity thereto. This restriction plug is coaxial with the inlet, and may be assembled into the fitting by insertion therethrough. The inlet opening is of cross-sectional area many times that of the restriction passage. This application is a division of my copending application, Serial No. 580,668, filed August 9th, 1922. Claims generic to the disclosure of the present application, and my copending application Serial No. 282,958, filed June 5, 1928, are presented in the latter, which is also a division of my application Serial No. 580,668.
In the accompanying drawings in which is shown one of various possible embodiments of the several features of the invention, Fig. 1 is a simplified diagrammatic view of a piping layout, and Fig. 2 is a view in longitudinal section of one of the drip plugs used in the various outlet branches of the system.

In Fig. 1 of the drawings is shown diagrammatically the general layout of the chassis of an automobile, equipped with a lubricant supply unit S, illustratively at the dashboard, serving to force lubricant into the head of a distributing system which includes headers $c$ and $d$ which communicate at their ends with two mains $m$, that extend the length of the channel frames and feed various bearings, at or near which the drip plug terminals $t$ are applied. Bridging conduits (not shown) are provided leading to distributing piping on the axles and supplying similar drip plugs at or near the bearings thereof (not shown).

In Fig. 2 is shown a drip plug comprising an integral elbow-shaped cartridge member 20 into the branch socket 21 of which is threaded a nipple fitting 22 for application to the bearing, and provided with a shoulder 22' abutting the end of the socket 21. A valve 23 of diameter only little less than that of fitting 22, is lodged therein and has a seating surface 24 preferably yielding to compensate for irregularities in the seat, smooth to seat completely under light pressure, substantially impervious and chemically inert to oil and non-sticking. The valve is held against smooth seat 25 in the outlet end of the nipple by means of a tension coil spring 26 affixed at one end to valve stem 23' extending through the bore of the nipple and secured at its opposite end to a perforated washer 27. The spring 26 serves concurrently to press the valve against its seat 25 and the washer against the end of the nipple.

The restriction passage is formed as an elongated groove formed in one of two tightly engaged surfaces, preferably between the bore of a fitting and a plug of hard material, snugly lodged therein.

In the specific embodiment shown the drip plug restriction comprises a plug 28 of metal or equivalent hard material having a multiplicity of turns of a fine thread, preferably a double or triple thread 29 upon the surface thereof, the apex of the thread determining a diameter equal to the bore 30 of the fitting, to fit tight therein, as shown, and maintained in position by a scalloped spring washer 31 snapped into a corresponding groove near the end of the fitting.

Preferably as shown, the bore of the fitting and the diameter of the plug are of relatively large diameter say more than half the diameter of the fitting or in the order of the diameter of the valve 23 or of the inlet opening 32 of the drip plug through which the plug may be inserted for assembly. The helical passage of many turns, determined by the contact between the plug and the bore of the fitting extends along a course of correspondingly large diameter and correspondingly great length. The inlet opening of the drip plug has a cross-sectional area many times that of the helical restriction.

Accordingly, within the confines of a small compact drip plug a passage of relatively enormous length is provided, so that the requisite resistance to flow is produced with a thread of dimensions that can readily be made in ordinary screw machines. The thread, by reason of its length is accordingly not so fine, that such minute particles carried with the oil, as might pass through a fine mesh metal screen of the character shown in the prior patent to Manzel No. 827,381, of July 31, 1906, would be apt to become lodged therein, and the danger of clogging is thus obviated.

The end of the feed pipe may be connected to the inlet end of the drip plug by any appropriate coupling which may be coaxial with the restriction plug. Illustratively a flanged collar 33 is soldered to the pipe $p$ and clamped against the end of the drip plug by a screw cap 34 threaded thereon, an interposed gasket 35 effecting a fluid-tight connection.

It will, of course, be understood that while the valve is illustratively shown at the exit side of the fitting, it is feasible to locate the valve at the inlet side and the resistance at the exit, or to employ in lieu of the tension spring for seating the valve, one of the type shown in my co-divisional application Serial No. 282,958 filed June 5, 1928.

The drip plug is readily installed at the bearing as a complete preassembled unit. Depending on the length of the restriction plug 28, therein, the drip plug may feed at a greater or lesser invariant rate under a given operating pressure. Each bearing when equipped with a drip plug of appropriate rating receives an accurately predetermined proportion of the output, fed from a common source of lubricant and pressure, and this substantially regardless of the viscosity or fluidity of the lubricant. The drip plug will respond promptly to the application of pressure to the feed pipe line and the valves 23 will close promptly to arrest flow or leak upon the discontinuance of operating pressure.

I claim:—

1. A drip plug comprising a pre-assembled restriction fitting including a pair of rigid pieces intimately correlated for snug liquid tight engagement thereof, locally relieved by minute clearance extending from end to end of the surface of contact, thereby to afford a highly restricted outlet passage through said restriction fitting, and a feed pipe coupling at an end of said fitting and affording an inlet to the fitting of area many times greater than that of the restriction passage within said fitting.

2. A drip plug comprising a pre-assembled fitting, including a pair of rigid pieces intimately correlated for snug liquid tight engagement thereof, one of said pieces having a fine groove at the surface of contact with the other, thereby to afford a highly restricted outlet passage through said restriction fitting, and a feed pipe coupling at an end of said fitting, affording an inlet to the fitting of area many times greater than that of said restriction passage within said fitting.

3. A drip plug comprising a pre-assembled restriction fitting including a pair of rigid pieces intimately correlated for snug liquid tight engagement thereof, one of said correlated pieces having a fine uniform groove in the surface of contact with the other, thereby to afford a highly restricted outlet passage through said restriction fitting, and a feed pipe coupling coaxial with said restriction fitting and affording an inlet to the fitting of area many times greater than that of the restriction passage within said fitting, said restriction fitting having an outlet nipple associated therewith for application at a bearing.

4. A drip plug comprising a fitting having a filler of hard material snugly lodged in a corresponding bore thereof and in liquid tight contact therewith, the surface of contact between said elements being relieved by a fine restriction groove, the inlet to said fitting being of effective cross-section many times greater than that of said restriction.

5. A drip plug fitting having an inlet at one end thereof, a feed pipe coupling coaxial therewith, a plug tightly lodged in a corresponding bore in said fitting, the contacting surface between the fitting and the plug being relieved by a continuous fine uniform groove to afford a pressure absorbing flow restriction of length much greater than that of said fitting and of cross-sectional area much less than that of said feed pipe coupling.

6. A drip plug fitting having a threaded inlet part and a nipple outlet part both of said parts being coaxial with the corresponding parts of the length of the fitting, a flow restriction comprising a plug of hard material, tightly lodged in a corresponding bore longitudinally of one end of the fitting, a groove being provided between the fitting and the plug, of length far greater than the length of said plug, to afford a continuous pressure absorbing flow restriction of cross-sectional area within said fitting far less than the effective area of the inlet to the fitting.

7. As an element in a lubricating installation, a drip plug comprising an apertured retaining member affording a lubricant inlet and an imperforate metallic filler therefor tightly fitting thereinto, the surface of contact between said members being interrupted to afford a groove within said fitting of minute cross-section much less than that of the inlet to the fitting for absorbing the pressure of lubricant forced therethrough.

8. A drip plug construction including a pipe fitting having a part adapted to be applied to a bearing, and a part adapted to have a feed pipe extremity coupled thereto, said drip plug including a flow restriction comprising a plug, of outer diameter substantially that of the inlet, and tightly fitted in a corresponding longitudinal bore in the fitting part and a thread of many convolutions cut in one of the engaging surfaces between the plug and the part and determining a helical passage within said fitting of considerable length and of cross-section much smaller than that of said inlet to the fitting.

9. A drip plug comprising a pipe fitting having a threaded inlet end for application of a pipe connection thereto, a nipple outlet adapted for application at a bearing, a plug of hard material lodged tight in a bore coaxially of said threaded inlet, said inlet affording an opening for admission of oil and sufficiently large for insertion of said plug, the surface of contact between said fitting and said plug being relieved by a fine restriction groove, affording a highly restricted passage for absorbing the pressure of lubricant forced therethrough.

10. A drip plug comprising a fitting having a nipple end for application to a bearing, and having a portion protruding from the bearing, of diameter little larger than said nipple end, a plug of diameter in the order of one half the diameter of said fitting tightly extending thereinto, one of said elements having a helically threaded portion engaged at the apex of the thread thereof by the other, to determine an elongated highly resistant helical passage for absorbing the pressure of lubricant forced therethrough.

11. A drip plug including a fitting element having a non-return valve therein, and a plug lodged tightly within a longitudinal cylindrical bore, one of said latter elements having a helical groove of a multiplicity of turns at the surface of contact thereof with the other, thereby affording an elongated highly restricted passage for absorbing the pressure of lubricant forced therethrough.

12. A drip plug including a fitting element having a non-return valve therein and a threaded plug extending longitudinally within a corresponding cylindrical bore to afford a tight fit at the apex of the thread and to determine an elongated passage therethrough.

13. A drip plug comprising a pair of co-acting fitting elements, one adapted to be applied at a bearing the other having a plug and socket connection therewith, one of said fitting pieces having a non-return valve therein, the other of said pieces having a plug of hard material and of diameter in the order of that of said valve, lodged snugly in a corresponding bore of said fitting piece, one of said elements having a thread of a multiplicity of turns cut therein, with the apex thereof snugly contacted by the other, to determine a highly resistant helical passage therethrough.

14. A drip plug fitting comprising a pair of fitting elements, one threaded into a corresponding socket of the other, one of said elements adapted to be affixed to a bearing, a check valve in a corresponding socket in the end of one of said fitting pieces, means retaining said valve in place therein, the other of said fitting pieces having a plug lodged snugly in a corresponding axial bore thereof and a thread cut into one of said elements and in snug engagement at the apex thereof with the surface of the other, thereby to determine an elongated helical passage for restricted flow of lubricant.

15. A drip plug comprising a pre-assembled fitting including a pair of rigid pieces intimately correlated for snug engagement therebetween, one of said correlated pieces having a fine groove in the surface of contact with the other, to afford a highly restricted outlet passage through said restriction fitting, a feed pipe coupling coaxial with said restriction fitting and affording an inlet of area many times greater than that of the restriction passage, a separate outlet nipple piece for said drip plug, having a plug and socket connection with the outlet end of said restriction fitting, said outlet nipple covering one end of the restriction passage exposed in the separate restriction fitting part.

16. A drip plug fitting comprising a fitting element adapted to be applied to a bearing, a second fitting element extending at right angles thereto, and having a threaded connection with the outer part thereof, a spring seated valve in one of said fitting elements, and a metal plug snugly fitting in a corresponding longitudinal bore in the other of said elements and of substantially the diameter of said valve, one of the surfaces of engagement between the fitting element and the plug having a helical thread cut thereinto to determine an elongated restricted flow resistant passageway therein.

17. A drip plug comprising a pair of fitting pieces, one threaded into a corresponding socket of the other, one of said pieces adapted to be affixed to a bearing, a check valve in a corresponding socket in the end of one of said pieces, means retaining said valve in place therein, the other of said fitting pieces having a restriction plug of hard material, snugly lodged therein and adapted to be inserted through the inlet end of said piece, the contacting surface of said plug in said fitting piece being relieved by a thread cut into one of said elements, the fitting having threaded means at the inlet thereof coaxial with said restriction plug, for application of a feed pipe terminal thereto, said inlet being of effective area many times greater than the cross-section of said restriction passage.

18. A drip plug including a fitting element having a restriction member, a valve at one end of said fitting, a washer at the other end of said fitting, a seat therefor, and a coil spring extending through said seat connected at one end to said valve and at the other to said washer and urging said valve thereagainst by tension.

19. A drip plug comprising a fitting having a lateral outlet socket, a rigid plug snugly fitting in a corresponding bore longitudinally of said fitting, the surface of contact between said plug and said fitting bore being relieved to afford a highly restricted passage of length far greater than that of said plug, the inlet of said restriction fitting having means for coupling a pipe terminal thereto, and a nipple fitting adapted to be applied to a bearing and plugged at its outer end into the lateral socket of said restriction fitting.

20. A drip plug comprising a pre-assembled restriction fitting including a pair of rigid pieces intimately correlated for snug engagement thereof, and a plurality of grooves extending from end to end of the surface of contact between the two pieces, thereby to afford restricted outlet passages in parallel through said restriction fitting.

21. A drip plug comprising a fitting having a filler of hard metal snugly lodged in a corresponding bore thereof the surface of contact between said elements being relieved by a plurality of fine restriction grooves extending the length of said contacting surface affording a plurality of restricted passages in parallel.

22. A drip plug including a fitting element having a plug extending longitudinally within a corresponding cylindrical bore, and a multiple thread on said plug, having a tight fit at the apex of the convolutions to determine a plurality of passages in parallel therethrough.

Signed at New York city, in the county of New York, and State of New York, this 25th day of May A. D. 1928.

JOSEPH BIJUR.